United States Patent Office 3,666,538
Patented May 30, 1972

3,666,538
PROCESS OF RENDERING A SOLID MATERIAL OIL AND WATER REPELLENT
Elemer Domba, Olympia Fields, Ill., assignor to Nalco Chemical Company, Chicago, Ill.
No Drawing. Continuation-in-part of application Ser. No. 848,103, Aug. 6, 1969. This application Oct. 12, 1970, Ser. No. 80,118
Int. Cl. D06m 15/00
U.S. Cl. 117—121                    5 Claims

ABSTRACT OF THE DISCLOSURE

The process of rendering a solid material oil and water repellent which comprises treating the material with an aqueous solution containing a fluoroamidoalkyl polysiloxane which is formed by the polymerization product of polyfluoro amido silane monomer and a copolymerizing monomer selected from the group consisting of epoxy siloxane monomer and silatranes; and drying to cure the treated material at a temperature of from 20–120° C.

This application is a continuation-in-part of my copending application Ser. No. 848,103, filed Aug. 6, 1969, now abandoned.

INTRODUCTION

Various commercial articles require oil and water repellency characteristics.

Examples of materials which could be rendered water and oil repellent are textile fabrics, textile yarns, leather, paper, plastic sheeting, wood, ceramics, clays, as well as manufactured articles prepared therefrom such as articles of apparel, wallpaper, paper bags, cardboard boxes, porous earthenware, etc.

Heretofore, the solution to providing a material both water and oil repellent has not been entirely satisfactory both from economic and an efficiency viewpoint. Some of the oil repellency agents heretofore used or suggested are inefficient and/or costly chemicals. Such chemicals require applications of large quantities thereof with respect to the weight of the fiber or solid material being treated therewith. The use of others is limited in that they can only be applied from an organic solvent.

It would be of great advantage to the art if a composition could be found useful for water and oil repellency which is water-soluble prior to application and water insoluble as a protective coating after application to some fiber or solid material and yet retain the desired properties of efficiency and economy.

It is also interesting to note that prior art materials do not effectively maintain their oil or water repellency upon being subjected to constant washings.

By oil repellency, for the purpose of definiteness, I shall refer hereinafter to the quality of repelling, under the standard test herein disclosed, a light mineral oil such as a commercial liquid hydrocarbon or a vegetable oil such as peanut oil. But as a general proposition the material tested according to this invention is found to possess repellency to oils, greases and fats generally regardless of their origin (as, for instance, mineral, vegetable or animal kingdom) or their consistency.

Similarly, water repellency shall hereinafter refer to the quality of repelling water under the standard test herein disclosed.

OBJECTS

It is, therefore, an object of this invention to provide a new oil and water repellent which can be water-soluble prior to application and extremely efficient from an economic point of view.

It is another object of this invention to impart to fiber and solid materials water and oil repellency which is maintained upon repeated washings.

Still another object is to provide an easy method of applying the water and oil repellent material to the solid materials such as through the use of an aqueous bath.

Other objects will appear hereinafter.

THE INVENTION

The new and novel water and oil repellent compositions taught by this invention are fluoroamidoalkyl polysiloxanes. These new compositions are extremely useful water and oil repellent agents.

The fluoroamidoalkyl polysiloxanes are formed as a polymerization reaction product of 15–100 mole percent of a polyfluoro amodo silane monomer represented by the formula:

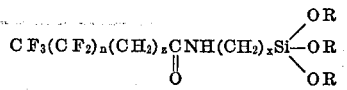

where:

(1) $z$ is 0–18, and is preferably 0–9;
(2) $n$ is 0–20, and is preferably 6;
(3) $x$ is 1–4, and is preferably 3; and
(4) R is selected from the group comprising methyl, ethyl, propyl and butyl and is preferably ethyl;

and 0–85 mole percent of a copolymerizing monomer from the group consisting of epoxysiloxane monomers and a silatrane.

In a preferred embodiment the mole percent of polyfluoro amido silane monomer is 15–25 and the mole percent of the copolymerizing monomer, i.e., epoxysiloxane or silatrane, is 75–85. Notice that the silane is trifunctional.

For the purposes of this invention mole percent will be defined to be based on total monomers present, i.e., the total polyfluoro amido silane and copolymerizing monomer.

Polyfluoro amido silane monomer

The polyfluoro amido silane monomer of this invention is produced by preparing a reaction mixture of an alkyl amino substituted silane ester and either a: (1) perfluoro acid halide; or (2) perfluoro alkyl ester.

In either case the mole ratio of the reactants is approximately 1:1.

The alkyl amino substituted silane ester is represented by the structural formula:

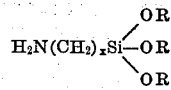

where $x$ and R are identified as given above.

The perfluoro acid halide is represented by the structural formula:

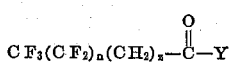

where $n$ and $z$ are identified as given above and Y is a halide selected from the group comprising Cl⁻, Br⁻ and I⁻.

The perfluoro alkyl ester is represented by the formula:

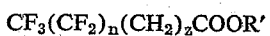

where R′ is the alkyl selected from the group comprising methyl, ethyl, propyl and butyl.

The reaction mixture in both cases may take place at room temperature and pressure in a time interval of 2–8 hours. The resulting reaction product is the polyfluoro amido silane monomer.

Epoxy siloxane monomer

The epoxy siloxane monomers used in this invention are commercially available products and are selected from the group comprising:

(1) beta-(3,4-epoxy cyclohexyl) ethyltrimethoxysilane;
(2) gamma-glycidoxypropyltrimethoxysilane; and
(3) 1,3 bis(3-glycidoxypropyl tetramethyldisiloxane).

Preferably, the epoxy siloxane has 1 or preferably 2 epoxide groups, and preferably is gamma-glycidoxypropyltrimethoxysilane.

Silatrane

Silatrane are rather unique compounds where the silicon atom has a valence of 5.

Silatrane is represented by the following formula:

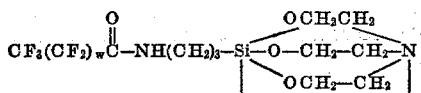

where W is 0–20, and preferably 6.

Homopolymerization system, i.e., 100 mole percent polyfluoro amido silane

The polymerization reaction may take place at 0 to 35° C. in a time interval of 1 to 120 minutes. Preferably, the reaction temperature is room temperature, i.e., about 25° C. and the time is less than one-half hour. The reaction solvent may be isopropynol, acetate or similar organic solvents.

The polymerization catalyst is hydroxyamine hydrogen chloride.

Copolymerization system, i.e., polymerization of polyfluoro amido silane and copolymerizing monomer When the copolymer is prepared, the polyfluoro amido silane is polymerized in the presence of an epoxy siloxane or a silatrane as defined above.

The mole percent of the polyfluoro amido silane is less than 100 and 15 or greater. The mole percent of the copolymerizing monomer is greater than zero and 85 or less.

Preferably, the mole percent of the polyfluoro amido silane monomer is 15–25 and the mole percent of the copolymerizing monomer is 75–85.

The copolymerization reaction is conducted under identical conditions as given for the homopolymerization reaction.

However, when the copolymerizing monomer is the epoxy siloxane one additional yet very critical ingredient is necessary. Such ingredient is an amine halide salt, preferably aniline chloride.

The properties of the resulting epoxy siloxane copolymer are strikingly unique. In addition to being an excellent water and oil repellent agent, the referred to copolymer is water-soluble prior to application. Subsequent to application and drying, the copolymer becomes water insoluble.

Their referred to water solubility is extremely unique since prior to this invention there were no fluoro silane compounds which were water-soluble. It would appear that the water solution of the copolymer is highly surface active and reduces the water surface tension even at low concentrations.

After polymerization the final polymer product in both homo- and copolymerization reactions is recovered.

Application

The oil and water repellents of this invention may be simply applied to fiber or solid material via roll application, dipping operations or similar industrial processes. They are particularly adaptable to treating wool fabrics, fiber glass, metallic materials, leather, textile materials such as carpets and rugs and synthetic fibers such as nylon.

The applied fluoro amido alkyl polysiloxanes are cured by drying the treated material at a temperature of from 20–120° C. as dependent on the fiber or solid material treated.

The resulting treated fiber or solid material may be characterized as an oil and water repellent composition.

EXAMPLES

The following examples are given to illustrate the present invention and are in no way intended to be restrictive.

EXAMPLE I

Perfluoro ethyl ester is prepared by a standard procedure, i.e.,

subsequent to preparation 0.1 mole of perfluoro ethyl ester is reacted with 0.1 mole of gamma-aminopropyltriethoxysilane having the formula:

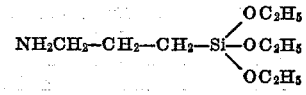

The perfluoro ethyl ester and the gamma-aminopropyltriethoxysilane react upon mixing, yielding an exothermic reaction. The ethyl alcohol is removed by distillation. The remaining oily residue is the product used for the homo- or copolymerization.

EXAMPLE II

Two-hundredths of a mole of perfluorooctylamidopropyl triethoxysilane is reacted with 0.1 mole gamma-glycidoxypropyltrimethoxysilane in a plastic vessel. Both reactants are dissolved in 70 ml. of isopropanol. Fifteen ml. of water are then added thereto followed by the addition of 2 ml. of a 2% solution of aniline —HCl in water. The reaction mixture is allowed to stand for 14 hours at room temperature. The copolymer is formed. The resulting copolymer is infinitely dilutable with water and ready for testing (or use).

EXAMPLE III

A perfluorooctylamidopropyl silatrane in which silicon has a valence of 5 has the following structural formula:

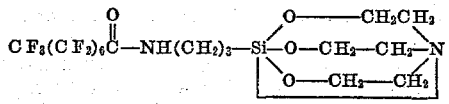

is reacted with 0.1 mole of perfluorooctylamidopropyl triethoxysilane and with 0.1 mole of triethylanolamine in 300 ml. of xylene solvent. One-hundredth of a gram of finely powdered KOH is added to the reaction mixture. The reactants are then heated to reflux temperature which is 140° C. The theoretical water is removed by azeotropic distillation. The reaction mixture is cooled to room temperature. The silatrane crystallizes out as a white, fine crystal, which is filtered and washed. Yields are very close to theoretical (0.1 mole).

EXAMPLE IV

The product of Example I is homopolymerized by adding water and $H_2SO_4$ catalyst thereto. The polymerization reaction takes place at room temperature.

EXAMPLE V

Perfluoro ethyl ester is prepared by a standard procedure, i.e.,

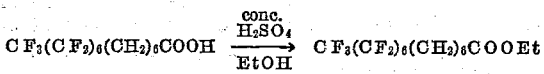

subsequent to preparation 0.1 mole of perfluoro ethyl ester is reacted with 0.1 mole of gamma-aminopropyltriethoxysilane having the formula:

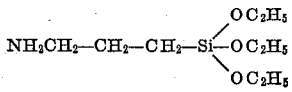

The perfluoro ethyl ester and the gamma-aminopropyltriethoxysilane react upon mixing, yielding an exothermic reaction. The ethyl alcohol is removed by distillation. The remaining oily residue is the product used for the homo- or copolymerization.

EXAMPLE VI

The product of Example V is homopolymerized by adding water and $H_2SO_4$ catalyst thereto. The polymerization reaction takes place at room temperature.

EXAMPLE VII

The product of Example V is homopolymerized by adding water and hydroxyamine hydrogen chloride salt catalyst thereto. The polymerization reaction takes place at room temperature.

EVALUATION OF THE INVENTION

Compositions taught in the prior art relating to imparting water and oil repellencies to solid materials have been limited to polyfluoroacrylates. The polyfluoroacrylates are completely water insoluble. In comparing the compositions taught by this invention with the polyfluoroacrylates commercially available, the instant invention composition was far superior. The various products were compared by subjecting them to oil and water repellency tests.

The oil repellency test is a standard test found in the technical manual of the American Association of Textiles Chemists and Colorists, volume 44, September 1968, published by Howes Publishing Company, Inc., New York, N.Y. The test is designed for evaluating the fabric's resistance to wetting by a selected series of liquid hydrocarbons of different surface tensions. The higher the oil repellency rating, the better resistance to staining by oily materials, especially liquid oily substances. Drops of standard test liquids, consisting of a selected series of hydrocarbons with various surface tensions were placed on the fabric surface and observed for wetting. The oil repellency rating is the highest number test liquid which does not wet the fabric's surface. Wetting of the fabric is normally evidenced by a darkening of the fabric at the liquid fabric interface.

Water repellency as measured by the spray test is also a standard test and can be found in the same technical manual described for the oil repellency test. It measures the resistance of fabrics to wetting by water. Water sprayed against the taut surface of a test specimen under controlled conditions produces a wetted pattern whose size depends on the relative repellency of the fabric. Evaluation is accomplished by comparing the wetted pattern with pictures on a standard chart. The higher the spray rating, the better the water repellency of the surface. A rating of 70 indicates partial wetting of the surface. Ratings of 70 and above are regarded as good water repellents.

Oil and water repellency tests were conducted in accordance with the procedures described above. All samples coated comprised uniform worsted natural flannel with an oil content of less than ½%.

Oil and water repellency tests regarding the fluoroamidoalkyl polysiloxanes of this invention are given below in Table I.

TABLE I

NOTE: A = Polyfluoro amido silane. B = Epoxysiloxane.

| Mole ratio | | Mole percent of— | | Concentration in percent | Oil repellency | Water repellency |
|---|---|---|---|---|---|---|
| A | B | A | B | | | |
| 1 | 5 | 16.7 | 83.3 | .36 | 6 | 100 |
| | | | | .18 | 6 | 100 |
| | | | | .08 | 5 | 100 |
| | | | | .04 | 3 | 100 |
| | | | | .02 | 2 | 100 |
| | | | | .01 | 1 | 100 |
| 1 | 1 | 50 | 50 | .10 | 6 | 100 |
| | | | | .01 | 5 | 100 |
| | | | | .005 | 3 | 100 |
| 1 | 3 | 25 | 75 | .30 | 6 | 100 |
| | | | | .15 | 5 | 100 |
| | | | | .07 | 5 | 100 |
| | | | | .03 | 4 | 100 |
| | | | | .015 | 2 | 100 |
| | | | | .005 | 1 | 100 |
| 1 | 10 | 9.1 | 90.9 | 1.80 | 6 | 100 |
| | | | | 0.30 | 4 | 100 |
| | | | | 0.10 | 1 | 100 |

It should be noted that in some cases the compositions outside of the preferred range, i.e., 15–25 mole percent of A and 75–85 mole percent of B, yield better oil repellancy results. The preferred ranges are critical for the sake of application to the material being coated. It is at the preferred ranges that complete water solubility exists.

To illustrate the durability of the fluoroamidoalkyl polysiloxane once applied as a protective oil repellent coating 100% wool fabric sample coated with the fluoroamidoalkyl polysiloxane were repeatedly rinsed in perchloroethylene and Stoddard solvent. The fluoroamidoalkyl polysiloxane tested was prepared by reacting 16.7 mole percent of polyfluoroamido silane with 83.3 mole percent of epoxysiloxane. The results are given below in Table II.

TABLE II

| Concentration of fluoroamido alkyl polysiloxane | Pick-up (percent based on fabric) | Oil rating | | |
|---|---|---|---|---|
| | | Initial | After 5 washing in— | |
| | | | perchloroethylene | Stoddard solvent |
| Percent solids: | | | | |
| 0.3 | 96 | 6 | 4 | 4 |
| 0.2 | 101 | 5 | 4 | 4 |
| 0.1 | 97 | 5 | 4 | 5 |
| 0.05 | 93 | 5 | 4 | 4 |

I claim:
1. The process of rendering a solid material oil and water repellent which comprises treating said material with an aqueous solution containing fluoroamidoalkyl polysiloxane formed as the polymerization product of 15–100 mole percent of a polyfluoro amido silane monomer represented by the formula:

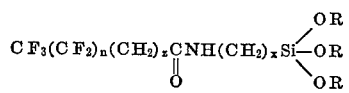

where:
(A) $z$ is 0–18,
(B) $n$ is 0–20,
(C) $x$ is 1–4 and
(D) R is selected from the group comprising methyl, ethyl, propyl and butyl;

and 0–85 mole percent of coplymerizing monomer selected from the group consisting of epoxysiloxane monomers and silatranes where the epoxysiloxane monomers are selected from the group consisting of:

(A) beta-(3,4-epoxycyclohexyl) ethyltrimethoxysilane,
(B) gamma-glycidoxypropyltrimethoxysilane, and
(C) 1,3 bis(3-glycidoxypropyl tetramethyldisiloxane);

and the silatranes are represented by the formula:

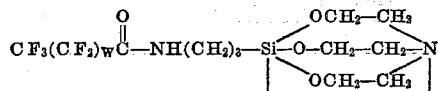

where W is 0–20 and where the mole percents are based only on total reacting monomers; and drying to cure said treated material at a temperature of from 20–120° C. as dependent on the solid material.

2. The method of claim 1 wherein $z$ is 0.9.
3. The method of claim 1 wherein $n$ is 6.
4. The method of claim 1 wherein $x$ is 3.
5. The method of claim 1 wherein R is ethyl.

References Cited
UNITED STATES PATENTS

| | | | |
|---|---|---|---|
| 3,032,576 | 5/1962 | Morehouse | 260—448.2 |
| 3,118,921 | 1/1964 | Samour | 260—448.2 |
| 3,470,130 | 9/1969 | WU | 260—37 |

WILLIAM D. MARTIN, Primary Examiner

T. G. DAVIS, Assistant Examiner

U.S. Cl. X.R.

117—139.5 A, 161 ZA